US012769653B2

(12) United States Patent
Um

(10) Patent No.: US 12,769,653 B2
(45) Date of Patent: Oct. 20, 2026

(54) MEMORY SYSTEM, MEMORY CONTROLLER AND OPERATING METHOD OF THE MEMORY SYSTEM FOR CONTROLLING GARBAGE COLLECTION

(71) Applicant: SK hynix Inc., Icheon (KR)

(72) Inventor: Gi Pyo Um, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 18/982,999

(22) Filed: Dec. 16, 2024

(65) Prior Publication Data

US 2025/0117327 A1 Apr. 10, 2025

Related U.S. Application Data

(63) Continuation of application No. 17/849,287, filed on Jun. 24, 2022, now Pat. No. 12,210,451.

(30) Foreign Application Priority Data

Mar. 16, 2022 (KR) ........................ 10-2022-0032656

(51) Int. Cl.
*G06F 12/02* (2006.01)
*G06F 3/06* (2006.01)

(52) U.S. Cl.
CPC ........ *G06F 12/0253* (2013.01); *G06F 3/0604* (2013.01); *G06F 3/0652* (2013.01); *G06F 3/0655* (2013.01); *G06F 3/0679* (2013.01); *G06F 2212/7205* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,915,444 | B2 | 2/2021 | Muchherla et al. | |
| 2015/0169442 | A1* | 6/2015 | Fisher | G06F 12/0253 711/103 |
| 2016/0188208 | A1 | 6/2016 | Kim et al. | |
| 2017/0351603 | A1* | 12/2017 | Zhang | G06F 3/0604 |
| 2020/0210330 | A1 | 7/2020 | Muchherla et al. | |

FOREIGN PATENT DOCUMENTS

| | | | |
|---|---|---|---|
| KR | 10-2016-0078611 | A | 7/2016 |
| KR | 10-2021-0004503 | A | 1/2021 |

* cited by examiner

*Primary Examiner* — Michael Alsip

(57) ABSTRACT

A memory system or memory controller may calculate a first data size, which is the sum of sizes of data requested to be written by write requests from outside the memory system after a first reference time point, calculate a second data size, which is the sum of sizes of data updated by the write requests among data already stored in the memory device from a second reference time point, and control execution of garbage collection on data stored in the memory device based on the first data size and the second data size.

20 Claims, 12 Drawing Sheets

MEMORY SYSTEM, MEMORY CONTROLLER AND OPERATING METHOD OF THE MEMORY SYSTEM FOR CONTROLLING GARBAGE COLLECTION

CROSS-REFERENCES TO RELATED APPLICATIONS

The present application is a continuation of U.S. patent application Ser. No. 17/849,287 filed on Jun. 24, 2022, which claims priority under 35 U.S.C. 119(a) to Korean patent application number 10-2022-0032656 filed on Mar. 16, 2022, which is incorporated herein by reference in its entirety.

TECHNICAL FIELD

The embodiments of the present disclosure relate to a memory system, memory controller and operating method of the memory system for controlling garbage collection.

BACKGROUND

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage (UFS) device, or an embedded MMC (eMMC) device.

The memory system may further include a memory controller for controlling a memory device. The memory controller may receive a command from the host and, on the basis of the received command, may execute the command or control read/write/erase operations on the memory devices in the memory system. The memory controller may be used to execute firmware operations for performing a logical operation for controlling such operations.

When the operation of writing data to the memory device is continuously executed, the size of a space in which data can be written is reduced in the memory device. Accordingly, the memory system may perform garbage collection in order to secure a free space in which data can be written in the memory device.

SUMMARY

Embodiments of the present disclosure may provide a memory system, memory controller and operating method thereof, capable of increasing write performance and extending a lifespan of a memory device included in the memory system by preventing unnecessary garbage collection.

In one aspect, an embodiment of the present disclosure may provide a memory system including i) a memory device configured to store data requested to be written by write requests from outside the memory system, and ii) a memory controller configured to calculate a first data size, wherein the first data size is the sum of sizes of data requested to be written by the write requests after a first reference time point, calculate a second data size, wherein the second data size is the sum of sizes of data updated by the write requests among data already stored in the memory device from a second reference time point, and control execution of garbage collection on data stored in the memory device based on the first data size and the second data size.

In another aspect, an embodiment of the present disclosure may provide a memory controller including i) a memory interface for communicating with an memory device configured to store data requested to be written by write requests from outside the memory controller, and ii) a control circuit configured to calculate a first data size, wherein the first data size is the sum of sizes of data requested to be written by the write requests after a first reference time point, calculate a second data size, wherein the second data size is the sum of sizes of data updated by the write requests among data already stored in the memory device from a second reference time point, and control execution of garbage collection on data stored in the memory device based on the first data size and the second data size.

In another aspect, an embodiment of the present disclosure may provide an operating method of a memory system including i) calculating a first data size, wherein the first data size is the sum of sizes of data requested to be written by write requests from outside the memory system after a first reference time point, ii) calculating a second data size, wherein the second data size is the sum of sizes of data updated by the write requests among data already stored in a memory device from a second reference time point, and iii) controlling execution of garbage collection on data stored in the memory device based on the first data size and the second data size.

According to embodiments of the present disclosure it is possible to increase write performance of a memory system and extend a lifespan of a memory device included therein by preventing unnecessary garbage collection.

DETAILED DESCRIPTION

Figure 1:
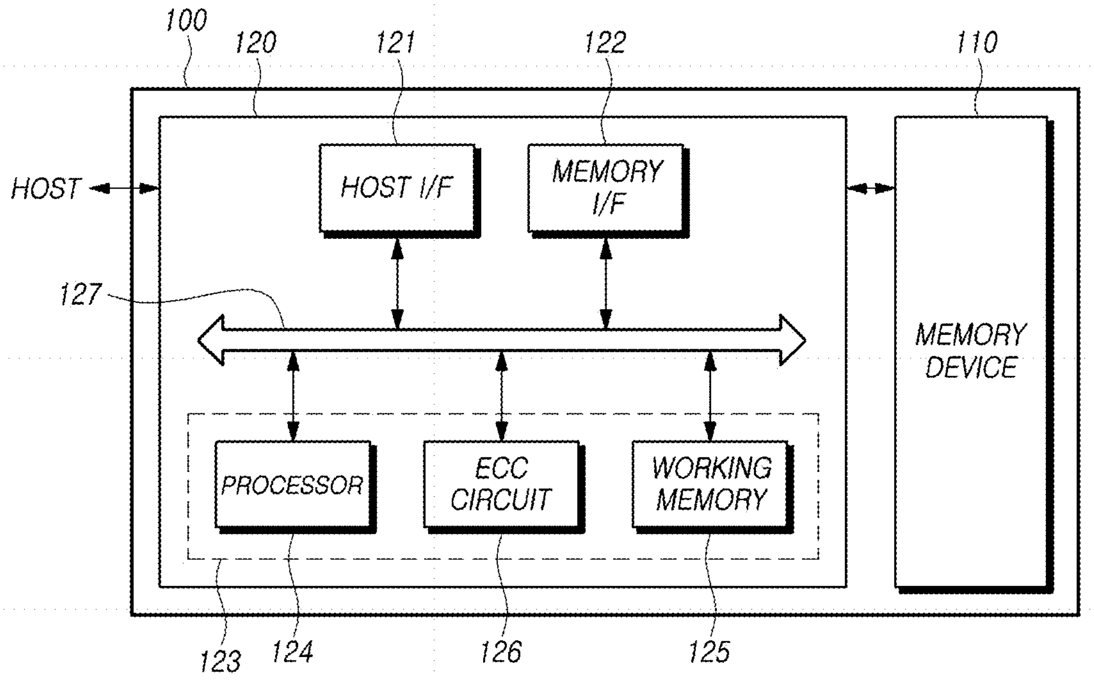
FIG. 1 is a schematic diagram illustrating a configuration of a memory system according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present disclosure are described below in more detail with reference to the accompanying drawings. However, the present disclosure may be embodied in different forms and variations, and should not be construed as being limited to the embodiments set forth herein. Rather, the described embodiments are provided so that this disclosure will be thorough and complete, and will fully convey the present invention to those skilled in the art to which this disclosure pertains. Throughout this disclosure, like reference numerals refer to like parts throughout the various figures and embodiments of the present disclosure.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented at least partially in software, the controllers, processors, devices, modules, units, multiplexers, generators, logic, interfaces, decoders, drivers, generators and other signal generating and signal processing features may include, for example, computer-readable media (such as a memory or other storage device) for storing code or instructions to be executed, for example, by a computer, processor, microprocessor, controller, or other signal processing device.

FIG. 1 is a diagram illustrating the schematic configuration of a memory system 100 based on an embodiment of the present disclosure.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the present disclosure are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. In addition, the memory controller 120 may control the operation of the memory device 110 even in the absence of a request from the host, such as when the memory controller 120 performs background operations of the memory device.

The memory controller 120 and the host may be separate devices. In some implementations, the memory controller 120 and the host may be integrated and implemented as a single device. In the examples included in the following description, the memory controller 120 and the host will be discussed as separate devices, but embodiments are not limited thereto.

Referring to FIG. 1, the memory controller 120 may include a memory interface (memory I/F) 122, a control circuit 123, and a host interface (host I/F) 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. That is, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one of a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
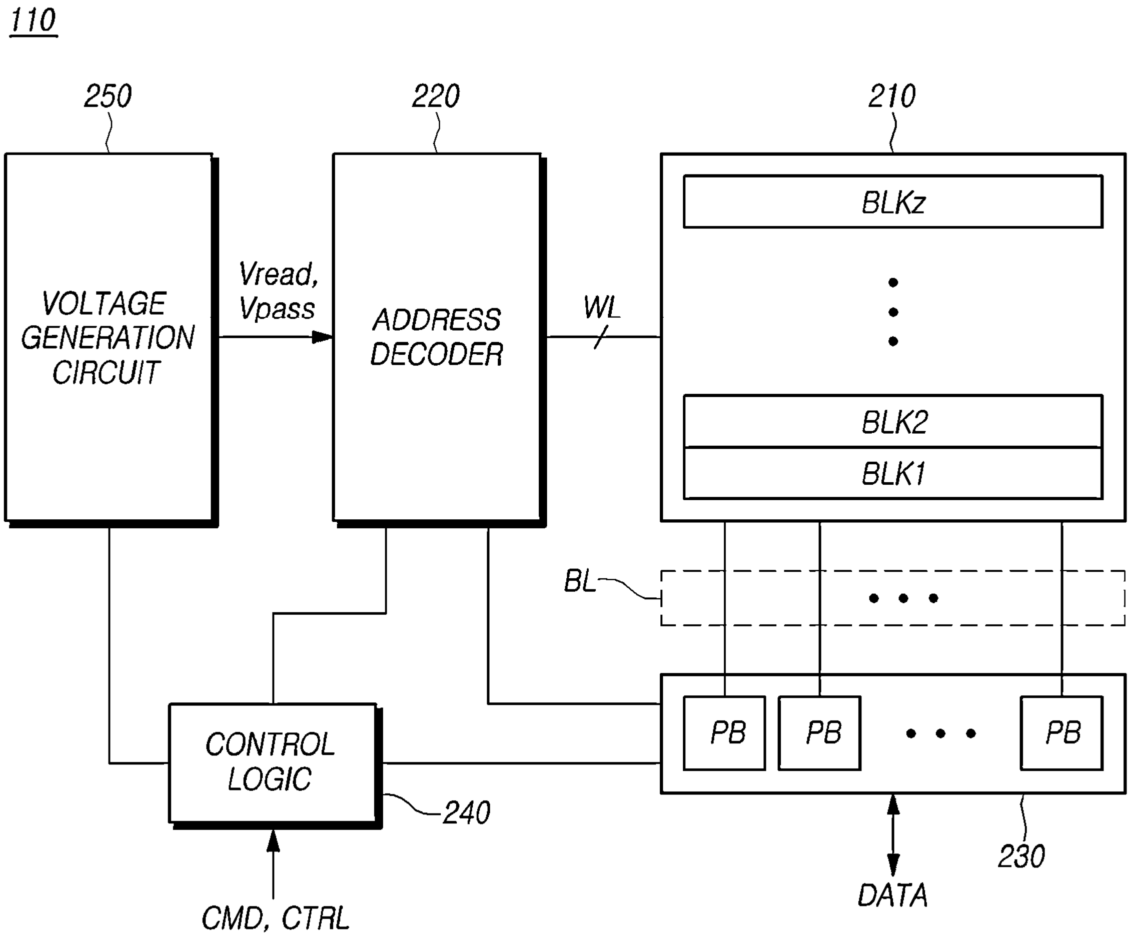
FIG. 2 is a block diagram schematically illustrating a memory device according to an embodiment of the present disclosure.

FIG. 2 is a block diagram schematically illustrating a memory device 110 in accordance with an embodiment of the present disclosure.

In some implementations, the memory device 110 may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
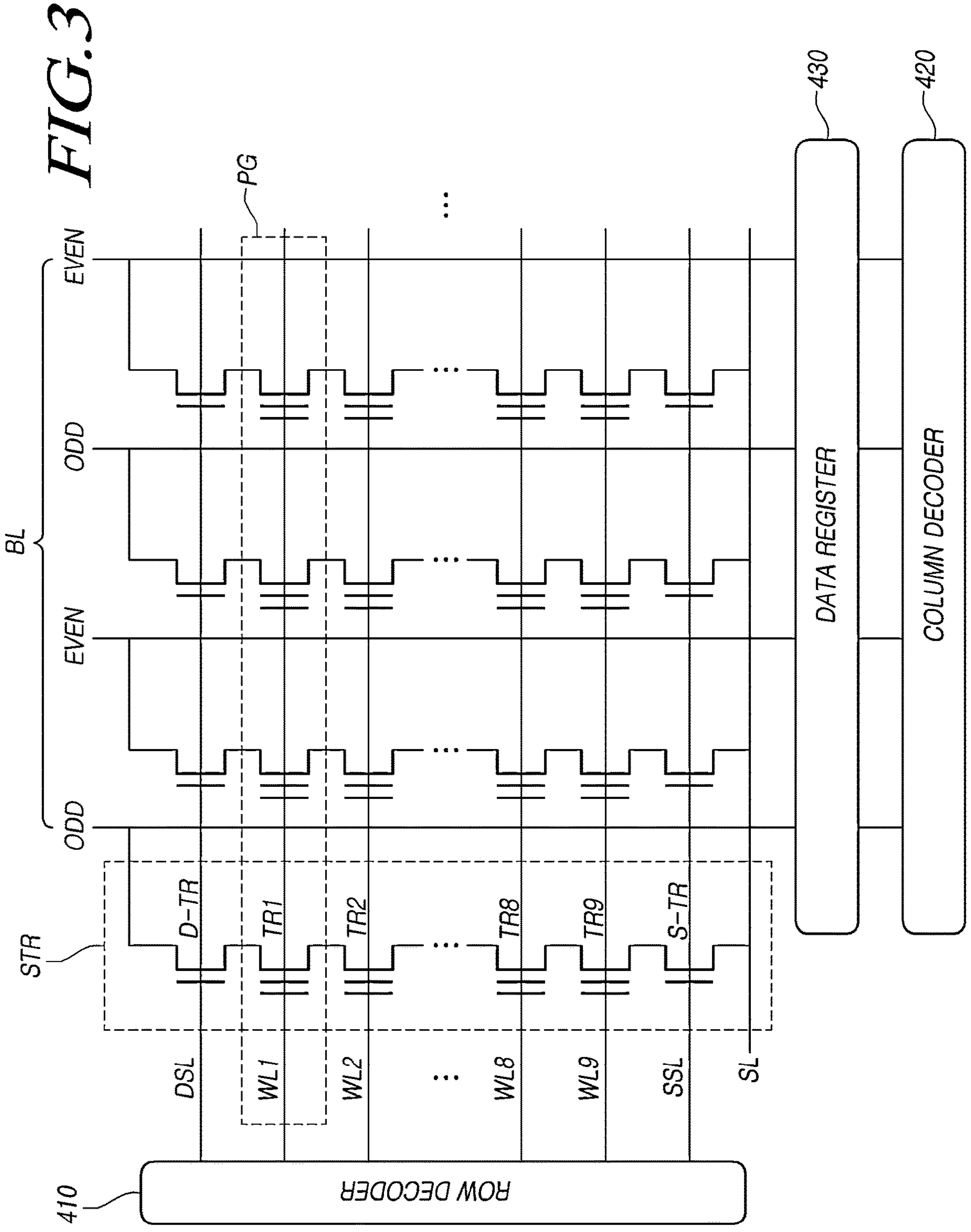
FIG. 3 is a diagram illustrating a structure of word lines and bit lines of a memory device according to an embodiment of the present disclosure.

FIG. 3 is a diagram illustrating a structure of word lines WL and bit lines BL of a memory device 110 in accordance with an embodiment of the present disclosure.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of an odd-numbered bit line and an even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch circuit that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
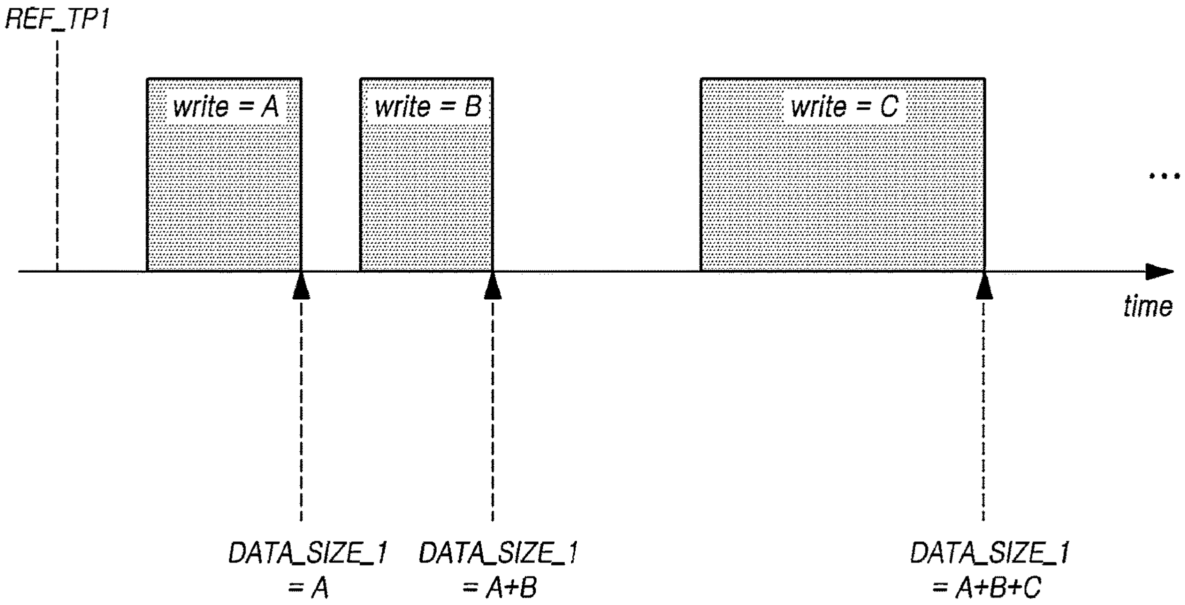
FIG. 4 illustrates an example of an operation in which the memory system calculates a first data size according to embodiments of the present disclosure.

FIG. 4 illustrates an example of an operation in which the memory system 100 calculates a first data size DATA_SIZE_1 according to embodiments of the present disclosure.

Referring to FIG. 4, the memory controller 120 of the memory system 100 may calculate a first data size DATA_SIZE_1, which is the sum of sizes of data requested to be written from outside the memory system 100 (e.g., host HOST) after a first reference time point REF_TP1. The first reference time point REF_TP1 is a reference time point at which the calculation of the first data size DATA_SIZE_1 is started.

The above-described first reference time point REF_TP1 may be arbitrarily determined or may be determined by another way. For example, the first reference time point REF_TP1 may be a time point when booting of the memory system 100 is completed. As another example, the first reference time point REF_TP1 may be a time point when a communication link is established between the memory system 100 and a device located outside the memory system 100. As another example, the first reference time point REF_TP1 may be a time point when the memory system 100 starts to receive a write request from outside of the memory system 100.

In FIG. 4, when the size of data requested to be written by a first write request from outside of the memory system 100 after the first reference time point REF_TP1 is A, the first data size DATA_SIZE_1 is A.

Subsequently, when the size of data additionally requested to be written by a second write request from outside the memory system 100 is B, the first data size DATA_SIZE_1 is A+B.

Subsequently, when the size of data additionally requested to be written by a third write request from outside the memory system 100 is C, the first data size DATA_SIZE_1 is A+B+C.

Each write request from outside of the memory system 100 may be a write request for new data or an update request for data already stored in the memory device 110 of the memory system 100.

Figure 5:
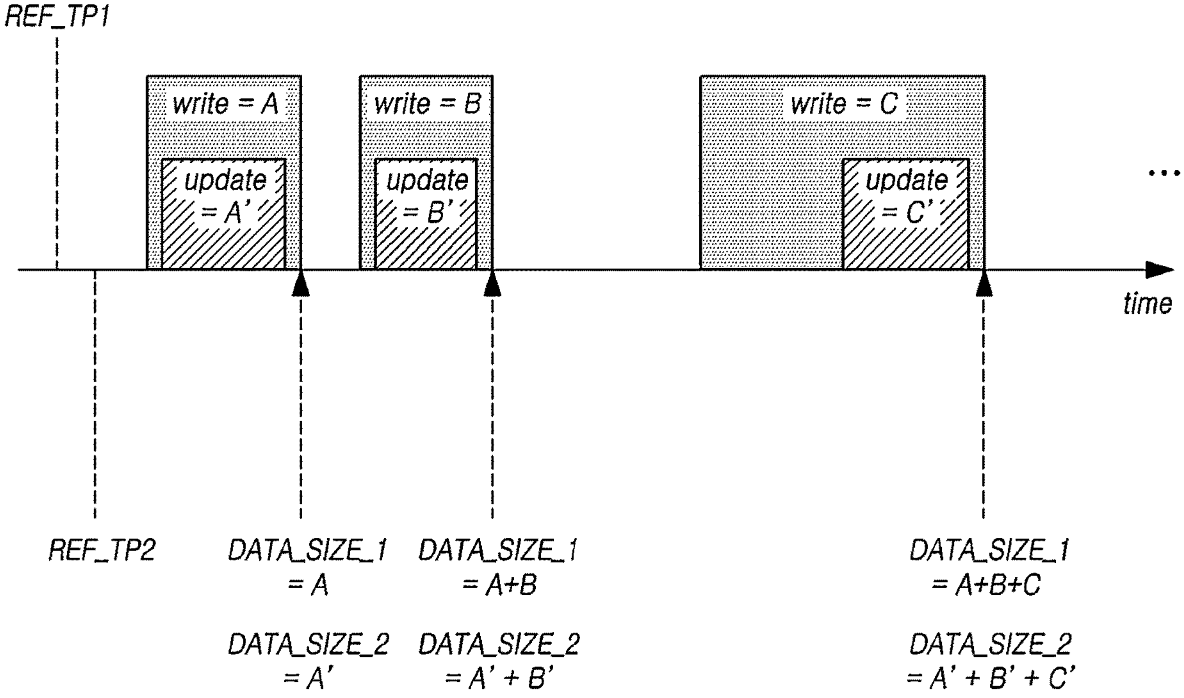
FIG. 5 illustrates an example of an operation in which the memory system calculates a second data size according to embodiments of the present disclosure.

FIG. 5 illustrates an example of an operation in which the memory system 100 calculates a second data size DATA_SIZE_2 according to embodiments of the present disclosure.

Referring to FIG. 5, the memory controller 120 of the memory system may calculate a second data size DATA_SIZE_2, which is the sum of sizes of data updated by write requests from outside of the memory system 100 (e.g., host HOST) among data already stored in the memory device 110 of the memory system 100 after a second reference time point REF_TP2. The second reference time point REF_TP2 is a reference time point at which the calculation of the second data size DATA_SIZE_2 is started.

The update of data already stored in the memory device 110 means that, in a state in which valid data corresponding to a specific logical address exists in the memory device 110, new data corresponding to the logical address is written to the memory device 110. Note that when new data corresponding to the logical address is written after data corresponding to that logical address is deleted due to a specific operation (e.g., an erase operation or a trim operation), data already stored in the memory device 110 is not considered to be updated.

In embodiments, the second reference time point REF_TP2 may be the same as the first reference time point REF_TP1 or may be a time point after the first reference time point REF_TP1.

In FIG. 5, when the size of data requested to be written by a first write request from outside of the memory system 100 after the first reference time point REF_TP1 is A and the size of data to be updated among data already stored in the memory device 110 is A', the first data size DATA_SIZE_1 is A and the second data size DATA_SIZE_2 is A'.

Subsequently, when the size of data additionally requested to be written by a second write request from outside the memory system 100 is B and the size of data to be updated among data already stored in the memory device 110 is B', the first data size DATA_SIZE_1 is A+B, and the second data size DATA_SIZE_2 is A'+B'.

Subsequently, when the size of data additionally requested to be written by a third write request from outside the memory system 100 is C and the size of data to be updated among data already stored in the memory device 110 is C', the first data size DATA_SIZE_1 is A+B+C, and the second data size DATA_SIZE_2 is A'+B'+C'.

In embodiments of the present disclosure, the memory controller 120 of the memory system 100 may control execution of garbage collection on data stored in the memory device 110 based on the first data size DATA_SIZE_1 and the second data size DATA_SIZE_2. For example, the memory controller 120 may determine whether to execute garbage collection on data stored in the memory device 110 based on the first data size DATA_SIZE_1 and the second data size DATA_SIZE_2 when the first data size DATA_SIZE_1 becomes equal to or greater than a multiple of predetermined reference data size. Garbage collection is process for creating free spaces for writing data in the memory device 110. Typically the free spaces are one or more blocks, and are created by erasing the one or more blocks after moving any valid data in them to other blocks.

The memory controller 120 may control execution of garbage collection on data stored in the memory device 110 based on the number of free memory blocks of the memory device 110. For example, the memory controller 120 may execute garbage collection on data stored in the memory device 110 when the number of free memory blocks of the memory device 110 is equal to or less than a preset threshold free memory block number.

In embodiments of the present disclosure, the memory controller 120 may consider the first data size DATA_SIZE_1 and the second data size DATA_SIZE_2 as well as the number of free memory blocks of the memory device 110 when controlling garbage collection execution. Hereinafter, this will be described in detail.

Figure 6:
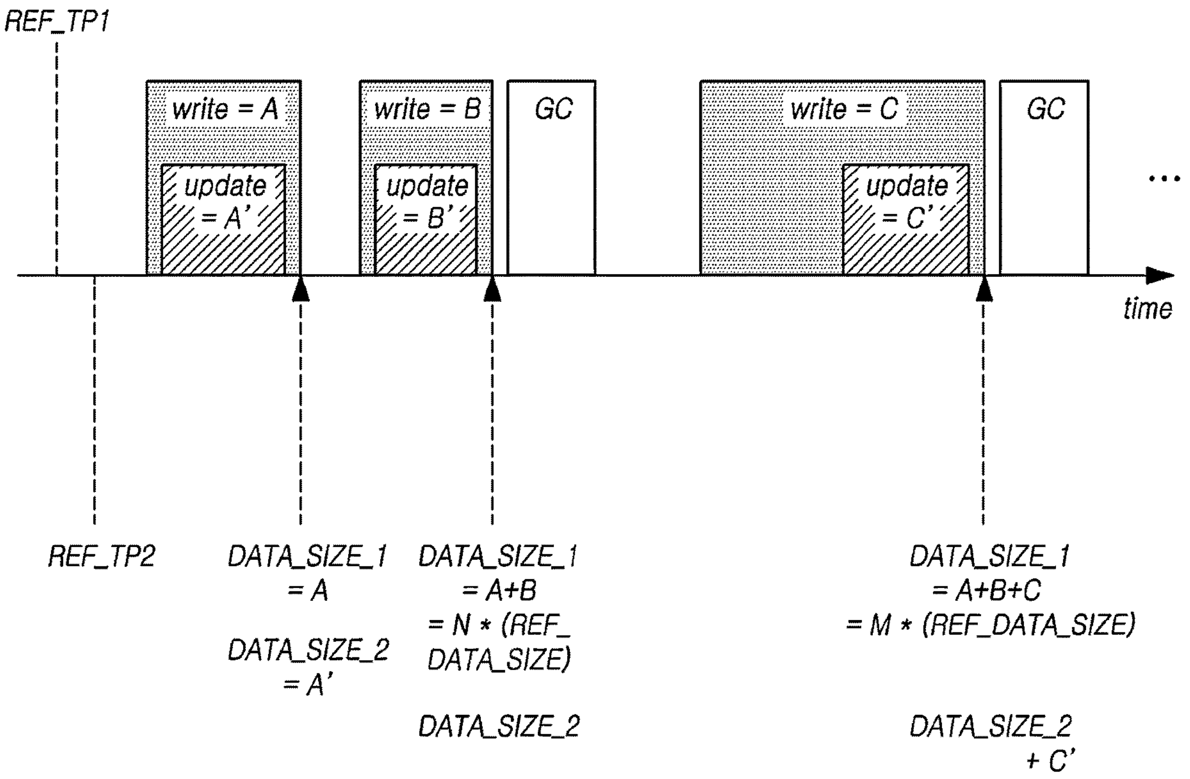
FIG. 6 illustrates an example of the memory system performing garbage collection according to embodiments of the present disclosure.

FIG. 6 illustrates an example of how the memory system 100 determines whether to execute garbage collection according to embodiments of the present disclosure.

Referring to FIG. 6, the memory controller 120 of the memory system 100 may execute garbage collection on data stored in the memory device 110 when the first data size DATA_SIZE_1 becomes equal to or greater than a multiple of a predetermined reference data size REF_DATA_SIZE.

The reference data size REF_DATA_SIZE may be determined in various ways. For example, the reference data size REF_DATA_SIZE may be determined based on the write throughput of the memory system 100.

The write throughput of the memory system 100 is the maximum value of the size of data that an external device (e.g., host HOST) of the memory system 100 can write to the memory system 100 during a predetermined time. For example, if the external device of the memory system 100 can write up to 256 megabytes (MB) of data to the memory system 100 in one second, the write throughput of the memory system 100 is 256 megabytes per second (MB/s).

The reference data size REF_DATA_SIZE may be determined as a multiple of the write throughput of the memory system 100. For example, the reference data size REF_DATA_SIZE may be determined to be 1 GB, which is 4 times of 256 MB, corresponding to data written by 4 seconds of writing at a write throughput of 256 MB/s.

As another example, the reference data size REF_DATA_SIZE may be determined in the process of optimizing the performance of the memory system 100 when the memory system 100 is developed. That is, the performance (e.g., execution speed of a read operation/write operation/erase operation) of the memory system 100 according to the various reference data size REF_DATA_SIZE may be measured. And as a result, the value that produces the highest performance may be set as the reference data size REF_DATA_SIZE.

When the first data size DATA_SIZE_1 becomes equal to or greater than a multiple of the predetermined reference data size REF_DATA_SIZE, the memory controller 120 may execute garbage collection by determining that it is necessary to secure a free space in which data can be newly written in the memory device 110.

In FIG. 6, when the first data size DATA_SIZE_1 becomes equal to or greater than N times (N is a natural number) the reference data size REF_DATA_SIZE, the memory controller 120 may execute garbage collection on the data stored in the memory device 110.

Thereafter, when the first data size DATA_SIZE_1 becomes greater than or equal to M times (M is a natural number different from N) the reference data size REF_DATA_SIZE, the memory controller 120 may re-execute garbage collection on data stored in the memory device 110.

As such, the memory controller 120 may secure a free space in which data can be written in the memory device 110 by executing garbage collection according to the size of data requested to be written from outside the memory system 100.

However, if the memory controller 120 always executes garbage collection whenever the first data size DATA_SIZE_1 becomes greater than or equal to a multiple of the predetermined reference data size REF_DATA_SIZE, there is a possibility that the memory controller 120 executes unnecessary garbage collection.

If the write request from outside of the memory system 100 is a request to update data already stored in the memory device 110, there is no need to separately execute garbage collection on the data to be updated. The memory device 110 does not overwrite data to the same (physical) location. Accordingly, when the memory device 110 processes a request for updating data already stored, the data already stored in the memory device 110 is invalidated and the updated data is written to a new location. As a result, even if a separate garbage collection is not performed for the updated data, the same effect as executing garbage collection may occur.

Accordingly, when the first data size DATA_SIZE_1 becomes a multiple of the predetermined reference data size REF_DATA_SIZE, the memory controller 120 may determine, based on the second data size DATA_SIZE_2, whether it is necessary to execute garbage collection. And, if it is determined that there is no need to execute garbage collection, the memory controller 120 may skip garbage collection. Skipping garbage collection means not executing garbage collection.

Through this, the memory controller 120 of the memory system 100 may prevent unnecessary garbage collection from being executed, which may increase the write performance of the memory system 100 and extend the lifespan of the memory system 100.

Figure 7:
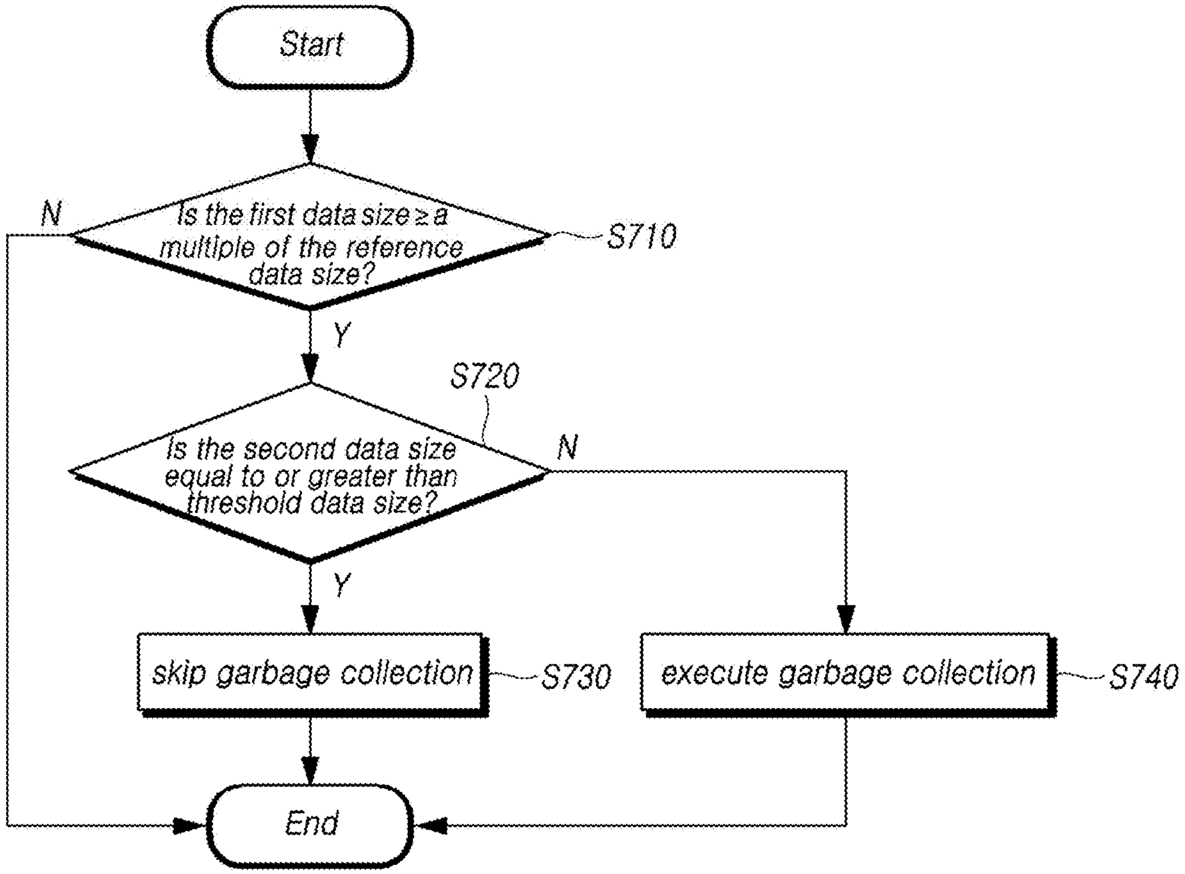
FIG. 7 illustrates a flow chart of an operation in which the memory system determines whether to skip garbage collection according to embodiments of the present disclosure.

FIG. 7 illustrates a flow chart of an operation in which the memory system determines whether to skip garbage collection according to embodiments of the present disclosure.

Referring to FIG. 7, the memory controller 120 of the memory system 100 determines whether the first data size DATA_SIZE_1 is greater than or equal to a multiple of the reference data size REF_DATA_SIZE (S710). If the first data size DATA_SIZE_1 is not greater than or equal to multiple of the reference data size REF_DATA_SIZE (S710—N), the memory controller 120 may end the operation of determining whether to skip garbage collection.

If the first data size DATA_SIZE_1 is equal to or greater than a multiple of the reference data size REF_DATA_SIZE (S710—Y), the memory controller 120 may determine whether the second data size DATA_SIZE_2 is equal to or greater than a predetermined threshold data size (S720).

In this case, the threshold data size may be the same as the reference data size REF_DATA_SIZE. That is, the memory controller 120 may determine whether the second data size DATA_SIZE_2 is equal to or greater than a reference size for executing one garbage collection. This is because, when the second data size DATA_SIZE_2 becomes equal to or greater than a reference size for executing one garbage collection, a gain of skipping garbage collection once occurs.

If the second data size DATA_SIZE_2 is equal to or greater than the threshold data size (S720—Y), the memory controller 120 may skip garbage collection for data stored in the memory device 110 (S730).

On the other hand, if the second data size DATA_SIZE_2 is less than the threshold data size (S720—N), the memory controller 120 may execute garbage collection for data stored in the memory device 110 (S740).

Figure 8:
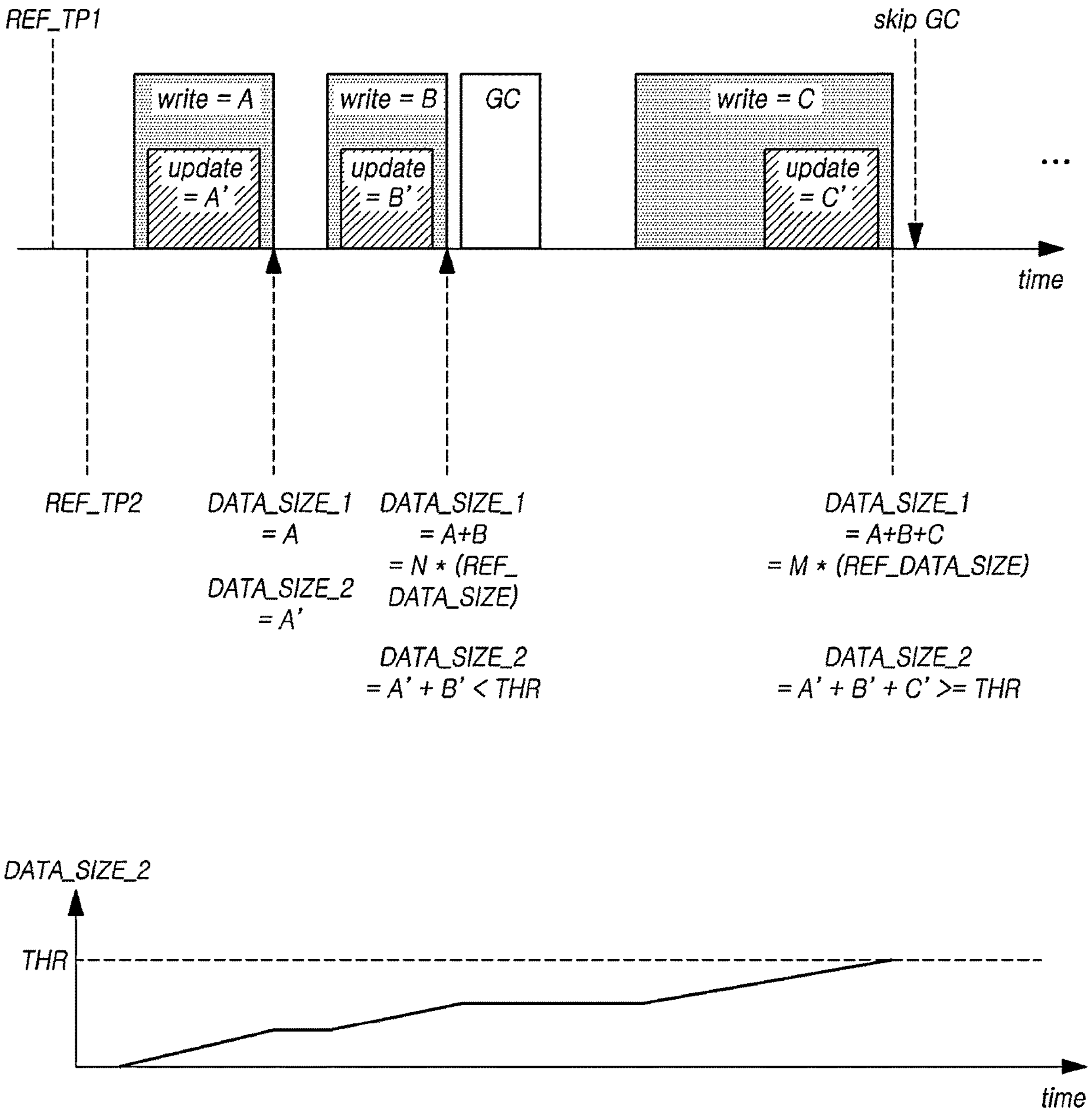
FIG. 8 illustrates an example of an operation in which the memory system skips garbage collection according to embodiments of the present disclosure.

FIG. 8 illustrates an example of an operation in which the memory system 100 skips garbage collection according to embodiments of the present disclosure.

Referring to FIG. 8, the memory controller 120 of the memory system 100 may check the second data size DATA_SIZE_2 when the first data size DATA_SIZE_1 becomes equal to or greater than N times the reference data size REF_DATA_SIZE.

When, after a first write request to write data of size A of which data of size A' is updated data, the first data size DATA_SIZE_1 is A, since the first data size DATA_SIZE_1 has not become equal to or greater than N times the reference data size REF_DATA_SIZE, the memory controller 120 does not execute garbage collection on data stored in the memory device 110.

When, after a second write request to write data of size B of which data of size B' is updated data, the first data size DATA_SIZE_1 is A+B, the first data size DATA_SIZE_1 becomes equal to or greater than N times the reference data size REF_DATA_SIZE, and in this example, the second data size DATA_SIZE_2, A'+B', is less than the threshold data size THR.

In this case, the memory controller 120 may execute garbage collection on data stored in the memory device 110.

Subsequently, the memory controller 120 of the memory system 100 may check the second data size DATA_SIZE_2 when the first data size DATA_SIZE_1 is M times the reference data size REF_DATA_SIZE. In this case, after a third write request to write data of size C of which data of size C' is updated data, the second data size DATA_SIZE_2, A'+B'+C', is greater than or equal to the threshold data size THR.

In this case, the memory controller 120 may skip garbage collection on data stored in the memory device 110. That is, the memory controller 120 may execute another operation (e.g., a read operation or a write operation) requested from outside of the memory system 100 instead of executing garbage collection. Accordingly, the memory controller 120 may prevent a problem in which the performance of the memory system 100 is degraded due to the garbage collection being executed.

In embodiments, the memory controller 120 may reset the second reference time point REF_TP2 and the second data size DATA_SIZE_2 after skipping garbage collection. This is to prevent the memory controller 120 from continuously skipping garbage collection when the memory system 100 receives an additional write request from outside of the memory system 100.

Figure 9:
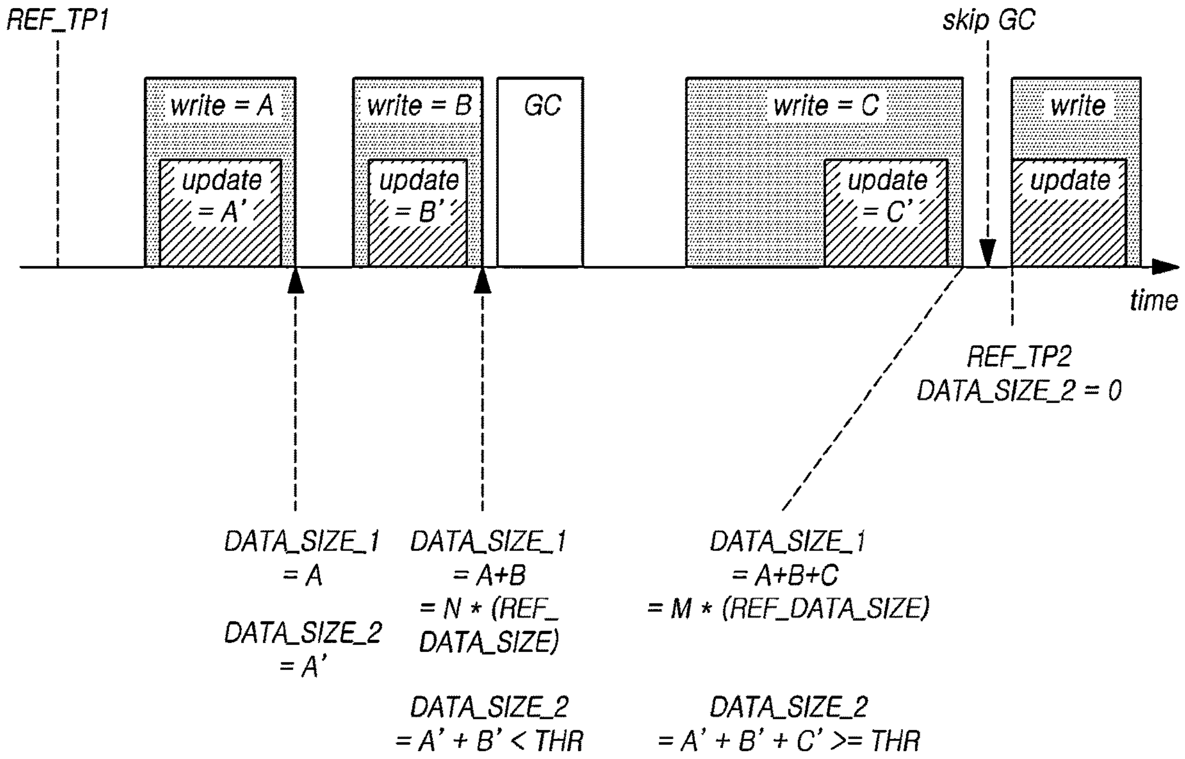
FIG. 9 illustrates an example of an operation in which the memory system resets the second reference time point and the second data size after skipping garbage collection according to embodiments of the present disclosure.
Figure 9:
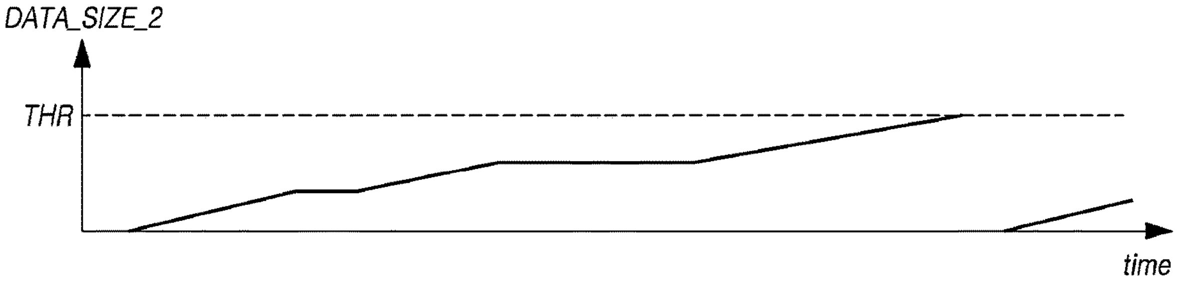

FIG. 9 illustrates an example of an operation in which the memory system 100 resets the second reference time point REF_TP2 and the second data size DATA_SIZE_2 after skipping garbage collection according to embodiments of the present disclosure.

Referring to FIG. 9, the memory controller 120 of the memory system 100 may reset the second reference time point REF_TP2 after a time point at which the memory controller 120 determined to skip garbage collection.

The memory controller 120 may reset the second data size DATA_SIZE_2 to 0. Thereafter, when data already stored in the memory device 110 is updated, the second data size DATA_SIZE_2 may increase again.

In embodiments, the memory controller 120 of the memory system 100 may change the execution time of garbage collection instead of skipping garbage collection as was described with reference to FIG. 8.

Figure 10:
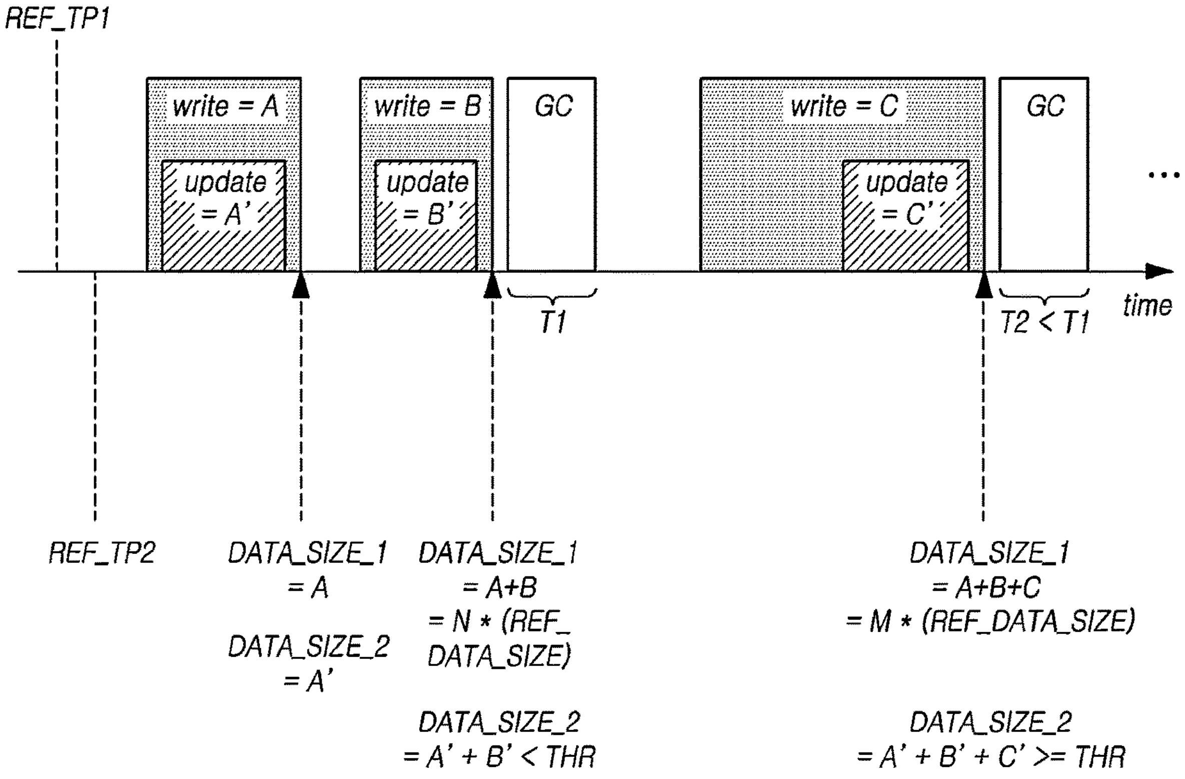
FIG. 10 illustrates an example of an operation in which the memory system changes an execution time of garbage collection according to embodiments of the present disclosure.

FIG. 10 illustrates an example of an operation in which the memory system 100 changes an execution time of garbage collection according to embodiments of the present disclosure.

Referring to FIG. 10, after first and second write requests with respective sizes of updated data A' and B', the memory controller 120 of the memory system 100 may check the second data size DATA_SIZE_2 when the first data size DATA_SIZE_1 becomes N times or more the reference data size REF_DATA_SIZE. In the example shown, the second data size DATA_SIZE_2, A'+B', is less than the threshold data size THR.

In this case, the memory controller 120 may execute garbage collection on data stored in the memory device 110 for a first time T1.

Subsequently, after a third write request with a respective size of updated data C', the memory controller 120 may check the second data size DATA_SIZE_2 when the first data size DATA_SIZE_1 becomes M or more times the reference data size REF_DATA_SIZE. In the example shown, the second data size DATA_SIZE_2, A'+B'+C', is greater than or equal to the threshold data size THR.

In this case, the memory controller 120 may execute garbage collection on data stored in the memory device 110 for a second time T2. In this case, the second time T2 is shorter than the first time T1.

That is, the memory controller 120 may reduce the maximum allowed time execution time for the garbage collection instead of skipping the garbage collection, thereby preventing the problem of degradation of the write performance of the memory system 100.

Figure 11:
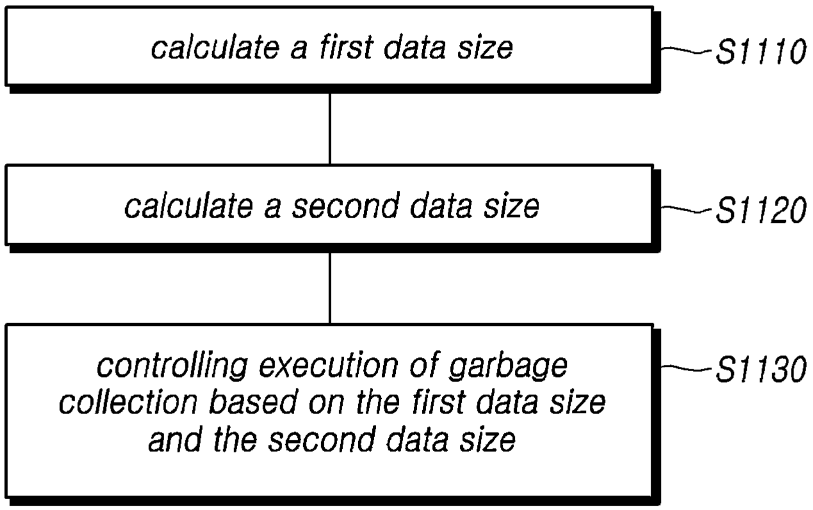
FIG. 11 illustrates an operating method of the memory system according to embodiments of the present disclosure.

FIG. 11 illustrates an operating method of the memory system 100 according to embodiments of the present disclosure.

Referring to FIG. 11, the operating method of the memory system 100 may include calculating a first data size DATA_SIZE_1, which is the sum of sizes of data requested to be written from outside the memory system 100 after a first reference time point REF_TP1 (S1110).

The operating method of the memory system 100 may further include calculating a second data size DATA_SIZE_2, which is the sum of sizes of data updated by write requests from outside of the memory system 100 among data already stored in the memory device 110 from a second reference time point REF_TP2 (S1120).

The operating method of the memory system 100 may further include controlling execution of garbage collection on data stored in the memory device 110 based on the first data size DATA_SIZE_1 and the second data size DATA_SIZE_2 (S1130).

For example, the operation S1130 may determine whether to execute garbage collection on data stored in the memory device 110 when the first data size DATA_SIZE_1 becomes greater than or equal to a multiple of a predetermined reference data size REF_DATA_SIZE.

In this case, the reference data size REF_DATA_SIZE may be determined based on the write throughput of the memory system 100.

For example, the operation S1130 may skip the garbage collection when the second data size DATA_SIZE_2 is greater than or equal to a predetermined threshold data size, and execute the garbage collection when the second data size DATA_SIZE_2 is less than the threshold data size.

In this case, the threshold data size may be equal to the reference data size REF_DATA_SIZE.

In embodiments, the operating method of the memory system 100 may further include resetting the second reference time point REF_TP2 and the second data size DATA_SIZE_2 after skipping the garbage collection in response to the second data size is greater than or equal to the threshold data size.

As another example, the operation S1130 may change, when the second data size DATA_SIZE_2 is equal to or greater than a predetermined threshold data size, an allocated time during which the garbage collection is executed from a first time T1 to a second time T2. The second time T2 may be shorter than the first time T1.

Figure 12:
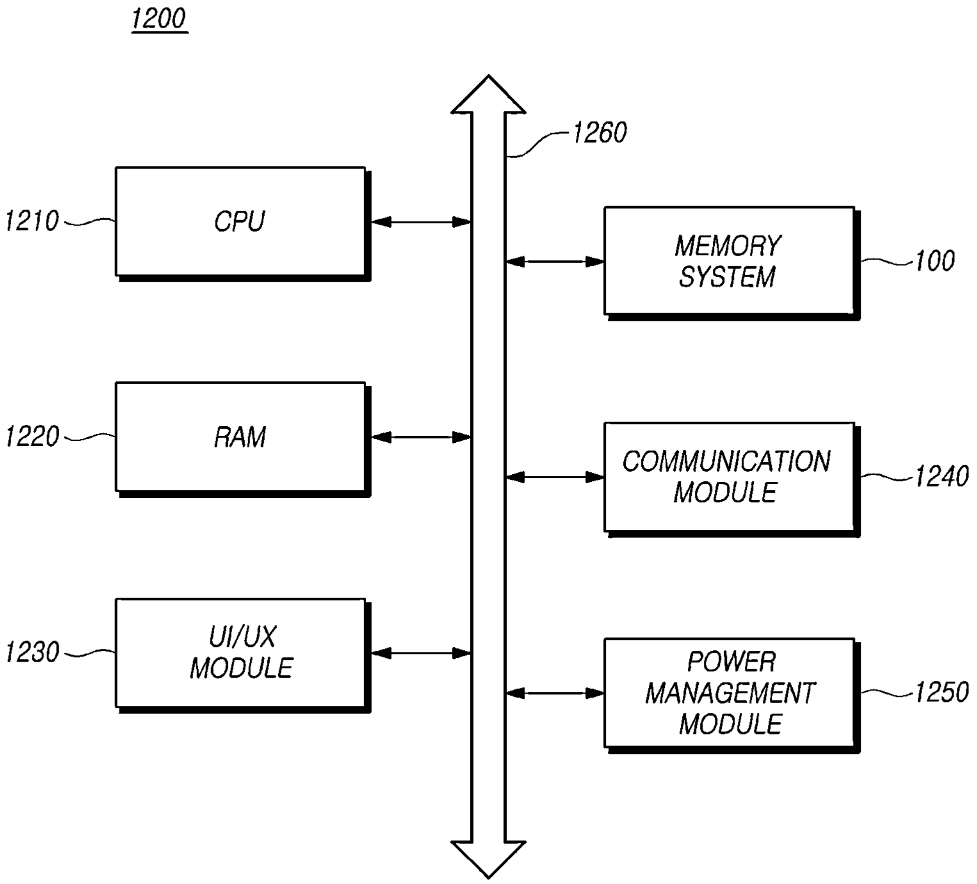
FIG. 12 is a diagram illustrating the configuration of a computing system based on some embodiments of the disclosed technology.

FIG. 12 is a diagram illustrating the configuration of a computing system 1200 based on an embodiment of the disclosed technology.

Referring to FIG. 12, the computing system 1200 based on an embodiment of the disclosed technology may include: a memory system 100 electrically connected to a system bus 1260; a CPU 1210 configured to control the overall operation of the computing system 1200; a RAM 1220 configured to store data and information related to operations of the computing system 1200; a user interface/user experience (UI/UX) module 1230 configured to provide the user with a user environment; a communication module 1240 configured to communicate with an external device as a wired and/or wireless type; and a power management module 1250 configured to manage power used by the computing system 1200.

The computing system 1200 may be a personal computer (PC) or may include a mobile terminal such as a smartphone, a tablet or various electronic devices.

The computing system 1200 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A memory system comprising:

a memory device configured to store data by write requests from outside the memory system; and a memory controller configured to:

determine an execution data size, wherein the execution data size is a sum of sizes of data updated by the write requests among data already stored in the memory device during a time period from a reference time point to a time point when a number of free memory blocks of the memory device becomes equal to or less than a preset threshold free memory block number, and skip a garbage collection at the time point when the execution data size is equal to or greater than a predetermined threshold data size.

2. The memory system of claim 1, wherein the memory controller executes the garbage collection at the time point when the execution data size is less than the predetermined threshold data size.

3. The memory system of claim 2, wherein the memory controller determines a first data size, wherein the first data size is a sum of sizes of data requested to be written by the write requests during a time period from a first reference time point which is before the reference time point to the time point.

4. The memory system of claim 3, wherein the first data size is greater than the execution data size.

5. The memory system of claim 3, wherein the first data size is equal to or greater than a multiple of a predetermined reference data size at the time point that the garbage collection is executed.

6. The memory system of claim 3, wherein the first data size is equal to or greater than a multiple of a predetermined reference data size at the time point that the garbage collection is skipped.

7. The memory system of claim 6, wherein the predetermined reference data size is equal to the predetermined threshold data size.

8. The memory system of claim 1, wherein the memory controller determines the execution data size by excluding a size of data by a write request for new data among the write requests during the time period.

9. The memory system of claim 1, wherein the memory controller resets the execution data size after skipping the garbage collection.

10. A memory system comprising:

a memory device configured to store data; and a memory controller configured to:

determine an execution data size, wherein the execution data size is a sum of sizes of data updated by write requests among data already stored in the memory device during a time period from a reference time point to a time point when a number of free memory blocks of the memory device becomes equal to or less than a preset threshold free memory block number; and execute a garbage collection during a first time when the execution data size is less than a predetermined threshold data size at the time point, and execute the garbage collection during a second time which is shorter than the first time when the execution data size is equal to or greater than the predetermined threshold data size at the time point.

11. The memory system of claim 10, wherein a sum of sizes of data requested to be written by write requests during a time period from a first reference time point to the time point is equal to or greater than a predetermined reference data size at the time point that the garbage collection is executed during the first time.

12. The memory system of claim 10, wherein a sum of sizes of data requested to be written by write requests during a time period from a first reference time point to the time point is equal to or greater than a predetermined reference data size at the time point that the garbage collection is executed during the second time.

13. The memory system of claim 12, wherein the first reference time point is before the reference time point.

14. The memory system of claim 10, wherein the memory controller resets the execution data size after the second time.

15. A memory system comprising:

a memory device configured to store data; and a memory controller configured to:

determine a first data size and a second data size, wherein the first data size is a sum of sizes of data requested to be written by write requests during a time period from a first reference time point to a first time point when a number of free memory blocks of the memory device becomes equal to or less than a preset threshold free memory block number, and the second data size is a sum of sizes of data updated by the write requests among data already stored in the memory device during a time period from a second reference time point to the first time point, and execute a garbage collection during a first time when the first data size is equal to or greater than a multiple of a predetermined reference data size and the second data size is less than a predetermined threshold data size at the first time point.

16. The memory system of claim 15, wherein the memory controller determines the first data size during a time period from the first reference time point to a second time point when the number of free memory blocks of the memory device becomes equal to or less than the preset threshold free memory block number, and the second data size during a time period from the second reference time point to the second time point, and skips the garbage collection when the first data size is equal to or greater than a multiple of the predetermined reference data size and the second data size is equal to or greater than the predetermined threshold data size at the second time point.

17. The memory system of claim 16, wherein the memory controller maintains the first data size and resets the second data size after skipping the garbage collection.

18. The memory system of claim 15, wherein the first data size is greater than the second data size, and the predetermined reference data size is equal to the predetermined threshold data size.

19. The memory system of claim 15, wherein the memory controller determines the first data size during a time period from the first reference time point to a second time point when the number of free memory blocks of the memory device becomes equal to or less than the preset threshold free memory block number, and the second data size during a time period from the second reference time point to the second time point, and executes the garbage collection during a second time less than the first time when the first data size is equal to or greater than a multiple of the predetermined reference data size and the second data size is equal to or greater than the predetermined threshold data size at the second time point.

20. The memory system of claim 19, wherein the memory controller maintains the second data size at the first time point that the garbage collection is executed during the first time, and resets the second data size at the second time point that the garbage collection is executed during the second time.

* * * * *